E. BAUSCH.
LENS SUPPORTING STRUCTURE.
APPLICATION FILED NOV. 17, 1913.

1,169,761. Patented Feb. 1, 1916.

Inventor
Edward Bausch

Witnesses
Walter B. Payne
Harriet T. Vay

By
his Attorneys

UNITED STATES PATENT OFFICE.

EDWARD BAUSCH, OF ROCHESTER, NEW YORK, ASSIGNOR TO BAUSCH & LOMB OPTICAL COMPANY, OF ROCHESTER, NEW YORK, A CORPORATION OF NEW YORK.

LENS-SUPPORTING STRUCTURE.

1,169,761.      Specification of Letters Patent.      Patented Feb. 1, 1916.

Application filed November 17, 1913. Serial No. 801,344.

*To all whom it may concern:*

Be it known that I, EDWARD BAUSCH, of Rochester, in the county of Monroe and State of New York, have invented certain new and useful Improvements in Lens-Supporting Structures; and I do hereby declare the following to be a full, clear, and exact description of the same, reference being had to the accompanying drawings, forming a part of this specification, and to the reference-numerals marked thereon.

My invention relates to lens supporting structures, with particular reference to its application to projection apparatus, and it has for its primary object to provide means for retaining a lens securely in a casing or mount in a manner that eliminates the use of screw threads or similar securing devices coming in contact with the lens.

A further advantage of the improvement is found in its low cost of manufacture as well as the simplicity of construction, which enables the parts to be readily assembled or disassociated.

An additional object of the invention resides in providing means for adjusting the parts to lenses of different thicknesses, thus obviating the necessity of constructing a separate support for each lens.

To these and other ends the invention consists in certain improvements and combinations of parts all as will be hereinafter more fully described, the novel features being pointed out in the claims at the end of the specification.

Figure 1:
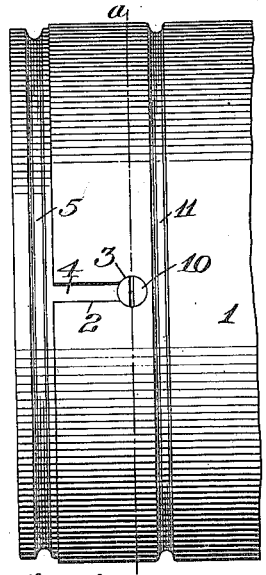
Figure 2:
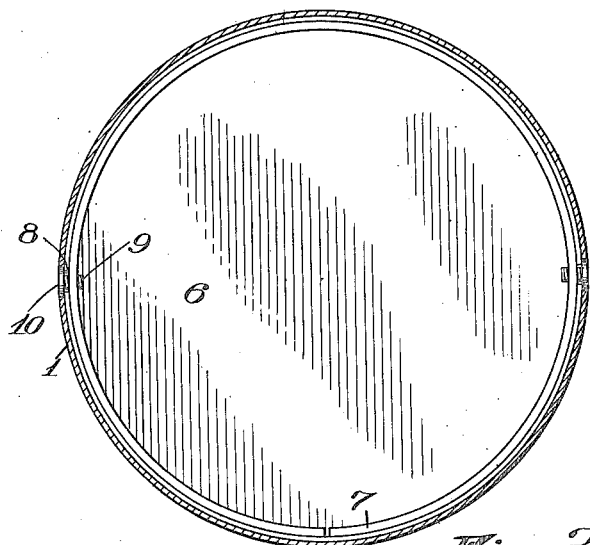
Figure 3:
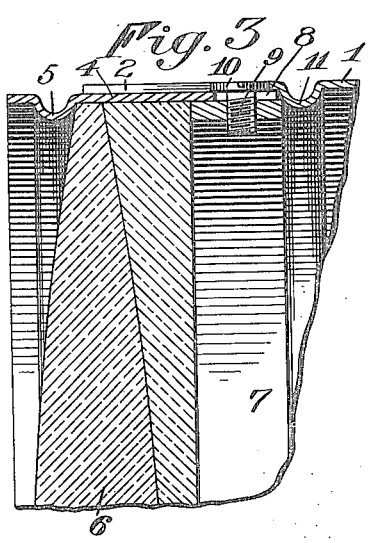
Figure 4:
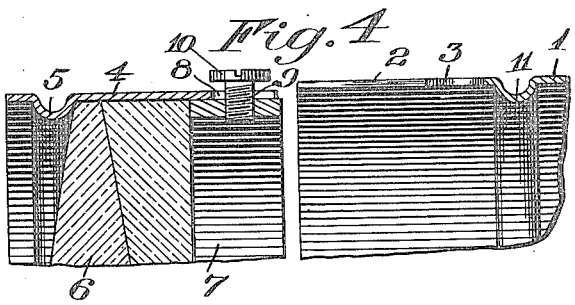
Figure 5:
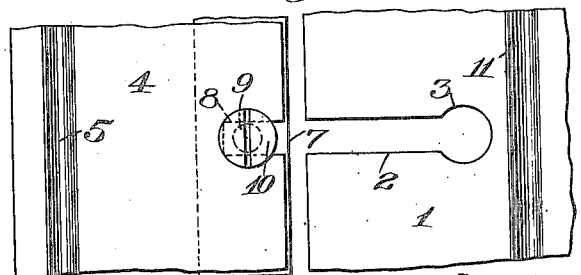

In the drawings: Figure 1 is a view in side elevation of a lens supporting device constructed in accordance with one embodiment of my invention; Fig. 2 is a sectional view on the line *a—a* of Fig. 1; Fig. 3 is a sectional view taken longitudinally through the central part of Fig. 1; Fig. 4 is an enlarged sectional view in the same plane as Fig. 3, showing the parts before assembling; and Fig. 5 is a view in elevation of the parts shown in Fig. 4.

Similar reference characters throughout the several figures indicate the same parts.

The invention as illustrated in the present embodiment is shown applied to a portion of a projection apparatus, in which 1 designates the usual cylindrical lens supporting casing, although it is to be understood that I do not limit myself to this particular means for carrying my ideas into effect. The casing is provided at its end with slotted openings 2 terminating in circular enlarged openings 3 for a purpose that will appear more clearly hereinafter.

Fitting within the casing 1 is a lens cell or carrying member 4, comprising a cylindrical portion or ring having an interiorly arranged annular flange 5, which is preferably integral with the ring and engages the lens as shown in Fig. 3. Obviously, the flange 5 may be replaced by any suitable means for limiting the movement of the lens relatively to the lens cell, when the parts are assembled. When the parts are completely assembled, the lens, designated at 6, rests against the flange 5, and is held in such position by means of a separate retaining device which coöperates with the lens carrying member, and preferably consists of a split ring 7 adapted to slide within the ring 4, and to engage the inner face of the lens, as shown in Figs. 3 and 4.

It is desirable to hold the lens, as well as its carrying member and the retaining device all by a single securing means, and also to provide for retaining lenses of different thicknesses by a slight adjustment of the parts. To this end, I provide slotted openings 8 in the lens carrying member 4, and coöperating openings in the retaining device 7, adapted to be alined with each other and also with the aforementioned openings 3 in the casing 1, and to receive the set screws 9. The latter are provided with circular heads 10, which fit within the enlarged openings 3. The casing 1 is provided with means for limiting the movement of the lens cell and retaining device, preferably consisting of an interiorly arranged integral flange 11, against which the ring 7 engages, as shown in Fig. 3. By tightening the set screws 9, the split ring 7 is drawn tightly into engagement with the inner surface of the lens carrying member, and this clamps it and the lens within the casing, the set screws being held against movement in the enlarged openings 3. To accommodate a lens of different thickness, the ring 7 is moved relatively to the lens carrying member 4 until it engages the lens, and the parts are then attached in the casing as already described.

In Figs. 3 and 4, I have illustrated the manner in which the parts may be assembled. For this purpose, the lens 6 is positioned in its carrying member against the flange 5 and the retaining device is moved against the lens 6, the set screws being turned partially into the ring 7, as shown. The entire structure is then moved into the casing, the stems of the screws passing through the slotted portions 2 until the ring 7 is engaged with the flange 11 and the heads 10 are in alinement with the enlarged openings 3. The screws are then turned down as far as possible until the heads 10 are within the openings 3, their outer surfaces being flush with the outer surface of the casing 1, and this clamps the ring 7 against the cell 4, and holds the parts rigidly together.

The construction affords a neat and simple means for holding a lens rigidly in proper position, at the same time providing for substituting or changing lenses readily and accurately, in a manner that protects them constantly against injury.

I claim as my invention:

1. In a lens supporting structure, the combination with a casing, of a lens cell removably arranged in the casing, lens retaining means detachably associated with said cell, and securing devices coöperating with the casing, lens retaining means and cell, and acting to hold the cell within the casing.

2. In a lens supporting structure, the combination with a casing, of a lens carrying member removably arranged in the casing, retaining means coöperating with the lens carrying member and with the casing to hold the lens in position and to clamp the carrying member in the casing, and securing devices coöperating with the retaining means and serving to hold it in engagement with the carrying member.

3. In a lens supporting structure, the combination with a casing, of a lens carrying member adapted to fit within the casing and provided with means for limiting movement of the lens therein, a clamping ring fitted within the lens carrying member and arranged to engage the opposite face of the lens, and securing devices passing through the casing and engaging the clamping ring whereby to hold the several parts in fixed relation to each other.

4. In a lens supporting structure, the combination with a casing, of a lens carrying member movable within the casing, a stop arranged in the casing for limiting the movement of the lens carrying member, means on the carrying member for limiting the movement of the lens therein, a clamping ring movable within the lens carrying member and operating to engage the lens and to clamp the carrying member in the casing, and securing devices coöperating with the casing and clamping ring to draw the latter into clamping engagement with the carrying member.

5. In a lens supporting structure, the combination with a casing, of a lens carrying member removably arranged in the casing, lens retaining means detachably associated with the lens carrying member, and securing devices coöperating with the casing and lens carrying member and acting to hold the latter within the casing.

EDWARD BAUSCH.

Witnesses:
WILLIAM G. WOODWORTH,
HENRY C. THON.